United States Patent [19]

Aidlin et al.

[11] 4,132,584

[45] Jan. 2, 1979

[54] MACHINE FOR MANUFACTURING FLAT-BOTTOMED BOTTLES

[76] Inventors: Samuel S. Aidlin, 214 Beaumont St., Brooklyn, N.Y. 11235; Stephen H. Aidlin, 934 Glenwood Rd., W. Hempstead, N.Y. 11552

[21] Appl. No.: 855,799

[22] Filed: Nov. 29, 1977

[51] Int. Cl.$^2$ .................. B65C 9/00; B65C 11/04
[52] U.S. Cl. ....................... 156/500; 156/567; 156/578
[58] Field of Search ............... 156/556, 566, 567, 578, 156/500

[56] References Cited

U.S. PATENT DOCUMENTS

| | | | |
|---|---|---|---|
| 3,297,504 | 1/1967 | Brown et al. | 156/556 |
| 3,873,400 | 3/1975 | Tsuchida et al. | 156/556 |
| 3,959,065 | 5/1976 | Ashcroft | 156/567 |

*Primary Examiner*—Douglas J. Drummond
*Attorney, Agent, or Firm*—Ross, Karl F.

[57] ABSTRACT

A machine for manufacturing plastic bottles by fitting round-bottomed hollow bodies of plastic material to flat-bottomed heels or base cups of similar material comprises a turntable forming a multiplicity of peripherally equispaced seats at a lower level and a like number of outwardly open radial recesses or pockets aligned therewith at an upper level. The hollow bodies are entrained by a conveyor from a blow-molding unit, in which they are produced, on a shelf which enters the turntable generally tangentially between the two levels and continues along a fraction of its periphery to a point just beyond a feeding station at which the separately produced heels are successively deposited on seats passing below the shelf. The hollow bodies, introduced by the conveyor into respective pockets above the shelf, then descend onto the underlying heels which are coated with a bonding agent such as a plastic melt. The body and its heel are held in firm contact, over another fractional revolution of the turntable, by a plunger preferably disposed thereabove; the resulting bottles are extracted further downstream by a stationary unloader.

12 Claims, 4 Drawing Figures

MACHINE FOR MANUFACTURING FLAT-BOTTOMED BOTTLES

FIELD OF THE INVENTION

Our present invention relates to a machine for manufacturing plastic bottles for beverages, especially soft drinks, by fitting preshaped round-bottomed container bodies with complementary flat-bottomed heels or base cups of preferably the same resinous material.

BACKGROUND OF THE INVENTION

A known method of manufacturing plastic bottles of thermoplastic synthetic resins includes the blow-molding of thin-walled containers from heavier parisons. These containers are generally made with rounded undersides since attempts to blow-mold flat-bottomed hollow bodies have not given satisfactory results in terms of stability against deformation. It has therefore already been proposed to assemble such bottles from two complementary members, i.e. a blow-molded body and a separately molded base cup, firmly bonded to each other.

OBJECT OF THE INVENTION

The object of our present invention is to provide an efficient machine for carrying out this manufacturing process with relatively simple means.

SUMMARY OF THE INVENTION

A machine according to our invention, co-operating with sources of supply for container members and complementary base members to be combined into finished workpieces in the form of bottles, comprises a generally horizontally moving transporter provided with seats for the base members and with holders for the container members at a more elevated levels. A series of preshaped container members are carried by first conveyor means to a loading station adjacent the transporter for successive insertion into respective holders while a series of base members are concurrently carried by second conveyor means to a feeding station adjacent the transporter for successive deposition on respective seats in line with the inserted container members. The two series of complementary members may be produced in the same plant by a blow-molding unit and an injection-molding machine, yet they could also be prefabricated and brought on from respective storage facilities. A bonding agent, which may be a thermoplastic melt, is sprayed by an applicator on contact surfaces of one series of members, preferably the concave upper surface of the cup-shaped base members or heels, traveling on the corresponding conveyor means toward the transporter. Upon proper emplacement of a base member and a container member on the transporter, with their complementary contact surfaces confronting each other, a clamping mechanism presses them together at these contact surfaces during hardening of the bonding agent. When the latter has substantially set, the finished workpiece is removed from the transporter by an extractor located at an unloading station, e.g. a stationary deflector. The transporter and the conveyors are preferably driven, continuously or in steps, by a common motor also synchronized with the clamping mechanism.

In a preferred embodiment of our invention, more fully described hereinafter, the transporter is a turntable with radial pockets constituting the container holders. The pockets are advantageously designed as two tiers of aligned peripheral recesses separated by an annular gap in which vanes of the first conveyor means as well as the unloading deflector may engage; a third tier of recesses forms part of the seats for the base members, holding then in line with the associated container members. To prevent the latter from descending prematurely onto the base members, especially when the loading station precedes the feeding station as seen in the direction of rotation of the turntable, we prefer to support them on an extension of their conveyor track hugging a peripheral sector of the turntable between the levels of the seats and the pockets, this support ending just beyond the feeding station at a point where the clamping mechanism becomes effective to hold the assembled bottle compressed until it reaches the unloading station. The several tiers of recesses are advantageously formed in respective coaxial disks forming part of the turntable.

The clamping mechanism preferably comprises a set of plungers, one for each pocket, rotating with the turntable and operated by fluid pressure through a simple valve system controlled by the rotary motion. This insures that each plunger is active over a precisely defined transport path lying between the feeding and unloading stations.

BRIEF DESCRIPTION OF THE DRAWING

The above and other features of our invention will now be described in detail with reference to the accompanying drawing in which.

SPECIFIC DESCRIPTION

Figure 1:
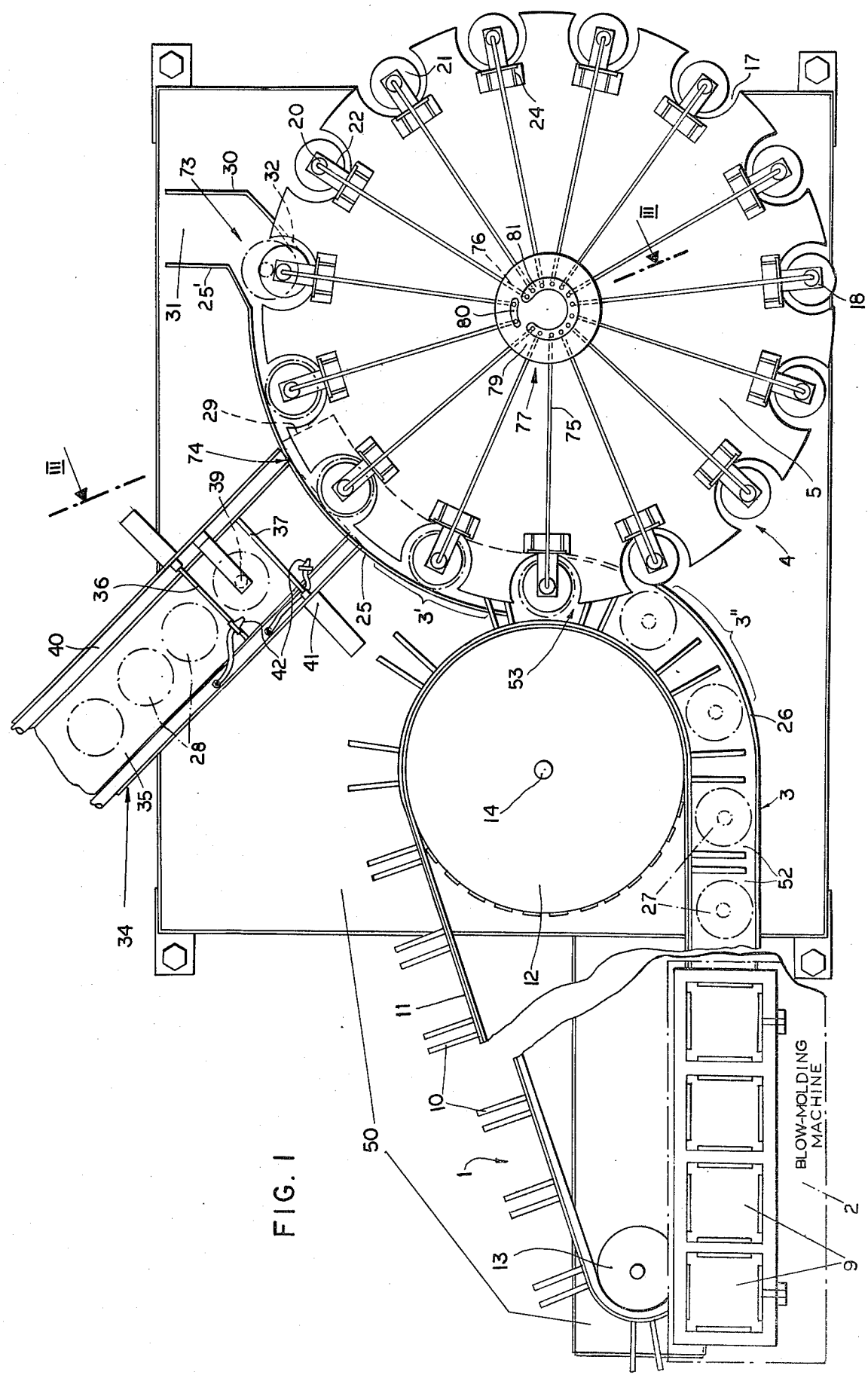
FIG. 1 is a top view of a bottle-making plant embodying our invention.
Figure 2:
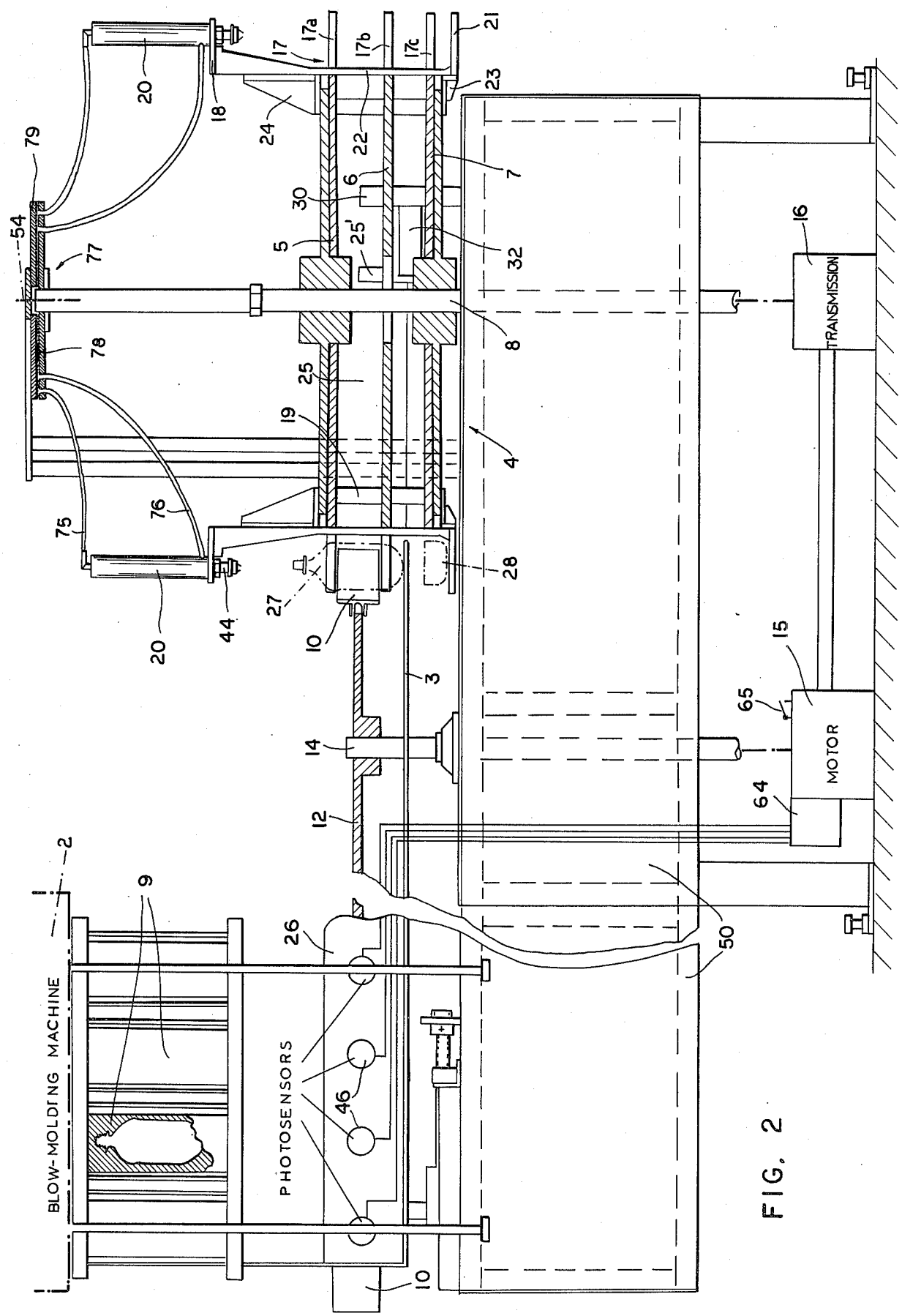
FIG. 2 is an elevational view of the plant illustrated in FIG. 1, with parts broken away.
Figure 3:
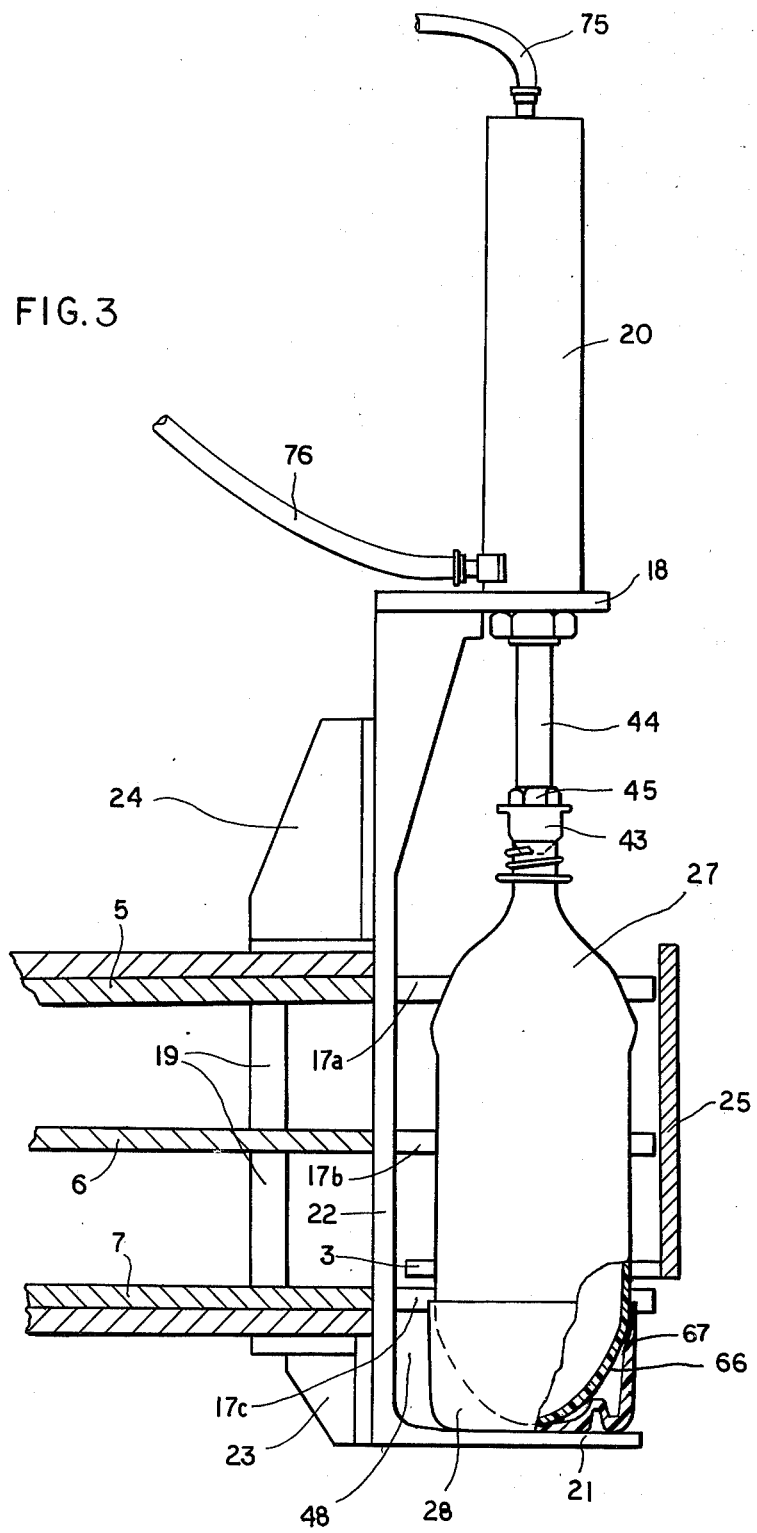
FIG. 3 is a cross-sectional view taken on the line III — III of FIG. 1 but drawn to a larger scale.

As illustrated in FIGS. 1 and 2, a plant for producing molded soft-drink bottles comprises a conveyor 1 for transporting thermoplastic container bodies from a blow-molding machine 2 to a turntable 4. The turntable includes three stacked circular disks 5, 6, 7 mounted for rotation about a vertical axis 54 on a shaft 8 which is journaled in a frame 50 and driven by a motor 15. The disks 5, 6, 7 are provided with fifteen peripherally equispaced sets of vertically aligned radial recesses 17a, 17b, 17c, the upper and intermediate recesses 17a, 17b forming fifteen generally semicylindrical outwardly and upwardly open pockets 17 for the reception of oncoming container bodies 27 carried from blow-molding unit 2 by conveyor 1. Each pocket 17 is overhung by a mounting 18 supporting a pneumatic cylinder 20 provided with a plunger 44. Mounting 18 is integral with an upright arm 22, attached to turntable 4 by a pair of brackets 23, 24, also forming a seat 21 framed by the lower recess 17c. Upright stays 19 juxtaposed with each pocket 17 serve to maintain the turntable disks 5-7 in vertical and angular alignment.

The thin-walled round-bottomed bodies 27 are shaped in the well-known manner, four at a time, in chambers 9 of blow-molding unit 2 suspended above frame 50. The four container members produced in each molding cycle are deposited on a generally S-shaped horizontal track 3 formed by a shelf rigid with frame 50, each container member being placed in a bay 52 defined by track 3 and a pair of vanes 10. In order to advance the molded container members 27 along track 3, the vanes 10 are attached to a cog belt 11 partly wound around two rotating sheaves 12 and 13; the larger sheave 12 is toothed for positive engagement with belt 11 and is driven by motor 15 via a vertical shaft 14 journaled in frame 50. The vanes 10 move at a level between the upper and middle tiers of recesses 17a, 17b, entering the annular gap between disks 5 and 6 at a loading station 53 to transfer the oncoming container bodies to the pockets 17 formed by these recesses from the bays 52 whose path at that point overlaps that of the pockets.

The rotation of the turntable by motor 15 via a transmission 16 is controlled by an array of photoelectric sensors disposed alongside the path of conveyor 1 in line with molding chambers 9 to monitor the discharge of successive sets of container bodies 27, four at a time, from machine 2. If blow-molding stops, or if less than four such bodies are produced in a molding cycle (which corresponds to a rotation of turntable 4 through four times the angular pitch of pockets 17, i.e. 96°, and an advance of conveyor 1 by many bays 52), sensors 46 operate a controller 64 to de-energize the motor 15. For this purpose, the sensors are periodically activated by a nonillustrated timer synchronized with the motor to detect light rays from radiation emitters across the conveyor 1 if no container bodies are interposed. Controller 64 may include a delay circuit designed to prevent the deactivation of motor 15 until the container bodies already molded have been fully processed. A hand-operated switch 65 may be used to override the sensors 46 and to restart the conveyor and turntable drive, with manual insertion of container bodies previously molded (or possibly coming from another source) into accessible bays 52. The S-shaped track 3 has an arcuate terminal segment 3' bounded on its convex side by an upstanding guardrail 25 serving to confine the container bodies 27 to their pockets 17. Track segment 3' ends in a radially oriented edge 29, rail 25 continuing beyond that edge along a peripheral sector of turntable 4 to an unloading station 73 where an extension 25' thereof bends radially away from the turntable opposite a stationary guide wall 30 defining therewith a discharge ramp 31. Wall 30 is provided with a deflecting finger 32 projecting between bottom disk 7 and middle disk 6 of the turntable to extract oncoming container bodies from pockets 17. Another segment 3" of track 3, partly curved in a sense opposite that of segment 3', has a vertical web 26 serving to guide the bodies 27 during their entrainment by conveyor 1.

Figure 4:
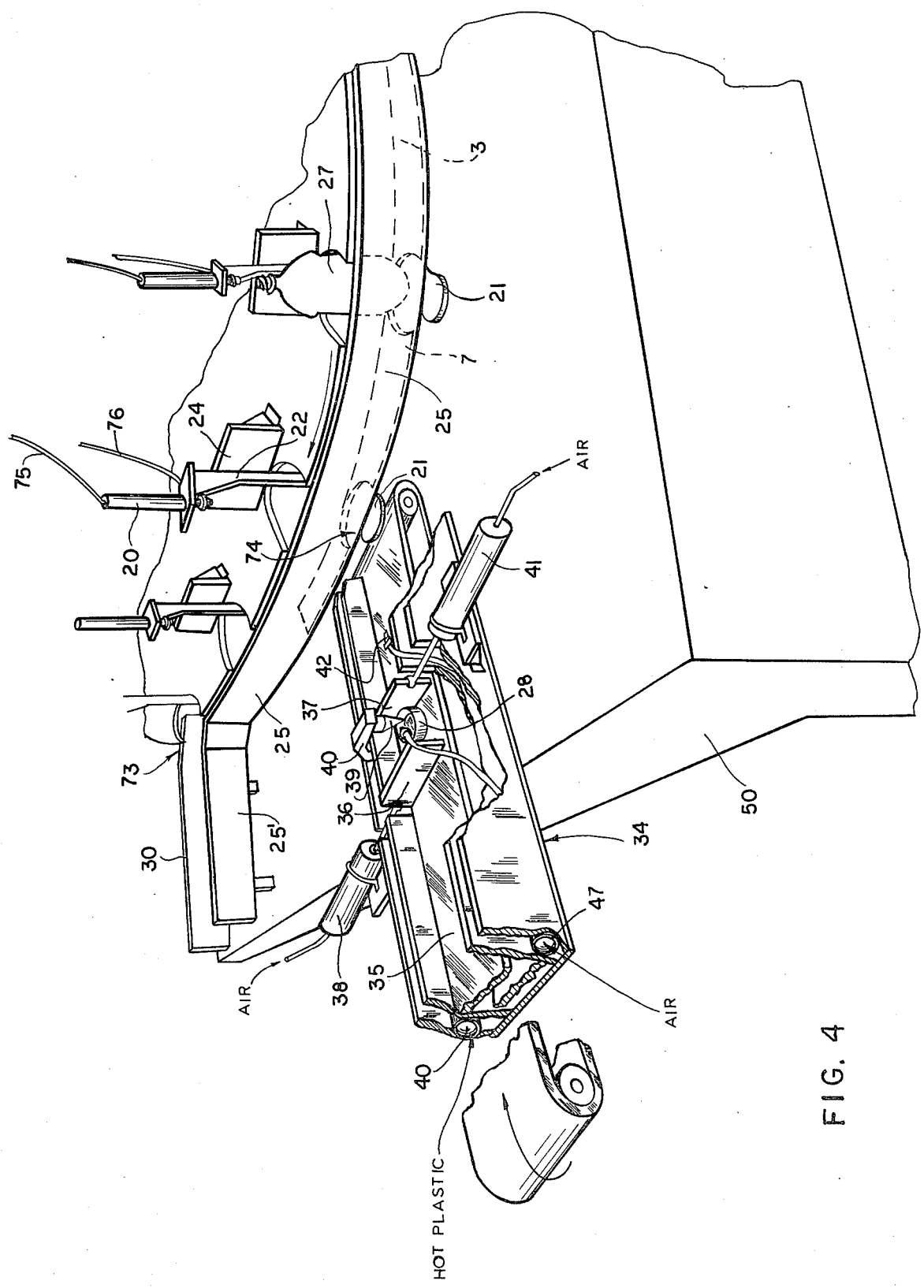
FIG. 4 is a perspective view of part of the plant shown in FIGS. 1 and 2.

In FIG. 4 we have shown a feeding station 74 at which substantially flat-bottomed base cups or heels 28, with concave upper contact surfaces 67 complementary to the rounded undersides 66 of bodies 27, are successively conveyed from a nonillustrated supply (e.g. an injection-molding machine synchronized with blow-molding machine 2) to turntable 4 by a chute 34 provided in its lower reach, approaching the turntable, with an endless belt 35. As a base cup 28 moves down this chute, it passes a laterally retracted upstream barrier 36 and comes to rest against a downstream barrier 37 extended across the conveyor path, the two barriers being linked with respective pneumatic actuators 38, 41 under the control of the aforementioned timer. The drive of belt 35 includes a nonillustrated transmission powered by motor 15 so that this belt, too, comes to a halt when the motor is deactivated by the sensors 46.

Barrier 36, whose separation from barrier 37 barely exceeds the diameter of a base cup 28, interposes itself between the arrested cup and the following ones to prevent them from pressing against the former. Next, the timer actuates an applicator 39 poised above the confined cup to coat its upper surface with a liquid bonding agent supplied through a conduit 40, e.g. a melt adhesive. Thereafter, barrier 37 is withdrawn and a blast of air from several nozzles 42, connected to a conduit 47, propels the adhesive-coated cup forward onto a seat 21 then located at feeding station 73. As the turntable advances, a container body 27 held in a raised position in the associated pocket 17 by the stationary track extension 3' crosses the edge 29 and descends into contact with the cup, partly under its own weight and partly under pressure of a plunger 44 concurrently actuated by the overlying air cylinder 20. The two members 27, 28 remain under this air pressure as the adhesive between their contact surfaces hardens on the way to unloading station 73.

For operating the plungers 44 upon their arrival above edge 29, pressurized air is fed to each cylinder 20 by a respective pair of hoses 75, 76 connected at their infeed ends to a valve coupling 77 (FIGS. 1 and 2) comprising a rotating lower disk 78 on the shaft 8 of turntable 4 and a stationary upper disk 79 provided with two arcuate slots 80, 81 which communicate with an air compressor (not shown). Upon the clearing of edge 29 by a pocket 17, the associated upper hose 75 conducts pressurized air from the small slot 80 to the upper end of the respective cylinder 20, thus driving the plunger 43 downward. The plunger remains in this extended position until the associated pocket 17 reaches the unloading station 73, whereupon the lower hose 76 is pressurized by air from the large slot 81, thus retracting the plunger.

The synchronized drives for conveyor 1, turntable 4 and feeder belt 35 may operate continuously or intermittently, e.g. in steps corresponding to an advance of the turntable by one pocket (i.e. 24°).

The container bodies 27 may be blow-molded from polyethylene terephthalate, for example, which is impervious to gases and can therefore be used with carbonated beverages. The base cups 28, on the other hand, may consist simply of polyethylene.

We claim:

1. A machine for producing plastic bottles with substantially flat undersides by bonding round-bottomed preshaped hollow plastic container members to complementary substantially flat-bottomed base members, comprising:

a generally horizontally moving transporter provided with seats for said base members and with holders for said container members above said seats;

first conveyor means extending from a supply of said container members to a loading station adjacent said transporter for successively inserting a series of container members into respective holders thereof;

second conveyor means extending from a supply of said base members to a feeding station adjacent said transporter for successively depositing a series of base members on respective seats thereof in line with the inserted container members, with a lower contact surface of each container member confronting a complementary upper contact surface of the aligned base member;

applicator means coacting with one of said conveyor means for coating one of said contact surfaces with a bonding agent preparatorily to emplacement of each member of the corresponding series on said transporter;

clamping means on said transporter operable upon emplacement of aligned container and base members for pressing them together at said contact surfaces thereof during hardening of said bonding agent to produce a finished workpiece;

extraction means at an unloading station downstream of said loading and feeding stations for removing successive workpieces from said transporter; and drive means for synchronously operating said transporter, said first and second conveyor means and said clamping means.

2. A machine as defined in claim 1 wherein said transporter comprises a turntable with peripherally equispaced outwardly open radial pockets constituting said holders, said first conveyor means forming a track approaching said turntable generally tangentially for radially introducing said container members into said recesses, said pockets being disposed at a level above that of said seats.

3. A machine as defined in claim 2 wherein said loading station precedes said feeding station in the direction of rotation of said turntable, further comprising support means for maintaining said container members spaced above said seats in said pockets between said loading and feeding stations.

4. A machine as defined in claim 3 wherein said support means comprises an extension of said track embracing a peripheral sector of said turntable between the levels of said pockets and said seats.

5. A machine as defined in claim 4 wherein said turntable comprises a plurality of vertically spaced coaxial disks with aligned peripheral recesses including a lower disk, an intermediate disk and an upper disk, the recesses of said intermediate and upper disks constituting said pockets, the recesses of said lower disk forming part of said seats.

6. A machine as defined in claim 5 wherein first conveyor means includes a set of vanes for entraining said container members on said track, said vanes being displaceable on a level between said intermediate and upper disks into an annular gap between said disks for inserting the entrained container members into said pockets.

7. A machine as defined in claim 6 wherein said extraction means comprises a stationary deflector reaching into said gap downstream of said feeding station.

8. A machine as defined in claim 3 wherein said pockets are accessible from above, said clamping means comprising a set of plungers above said pockets and actuating means for lowering each plunger onto a container member in the underlying pocket upon movement thereof past said feeding station, said support means being a stationary shelf terminating at said feeding station.

9. A machine as defined in claim 8 wherein said second conveyor means includes an endless belt, further comprising retractable gate means synchronizes with said drive means for arresting an oncoming base member immediately ahead of said feeding station in line with said applicator means to enable the coating thereof with said bonding agent.

10. A machine as defined in claim 9 wherein said second conveyor means further includes nozzle means for generating an air jet upon retraction of said gate means to drive the coated base member onto a confronting seat of said turntable.

11. A machine as defined in claim 9 wherein said gate means comprises a pair of barriers upstream and downstream of said applicator means, the upstream barrier being interposable between a base member being coated and further base members entrained by said belt.

12. A machine as defined in claim 1 wherein the supply of container members includes a blow-molding unit producing a predetermined number of container members at a time, said first conveyor means being positioned to receive said number of container members, further comprising monitoring means at said blow-molding unit for deactivating said drive means upon failure of said first conveyor means to receive said number of container members at regular intervals.

* * * * *